Oct. 16, 1956
W. K. McGINTY ET AL
2,767,307
RECESSED LIGHTING FIXTURE BOX
Filed Oct. 7, 1954
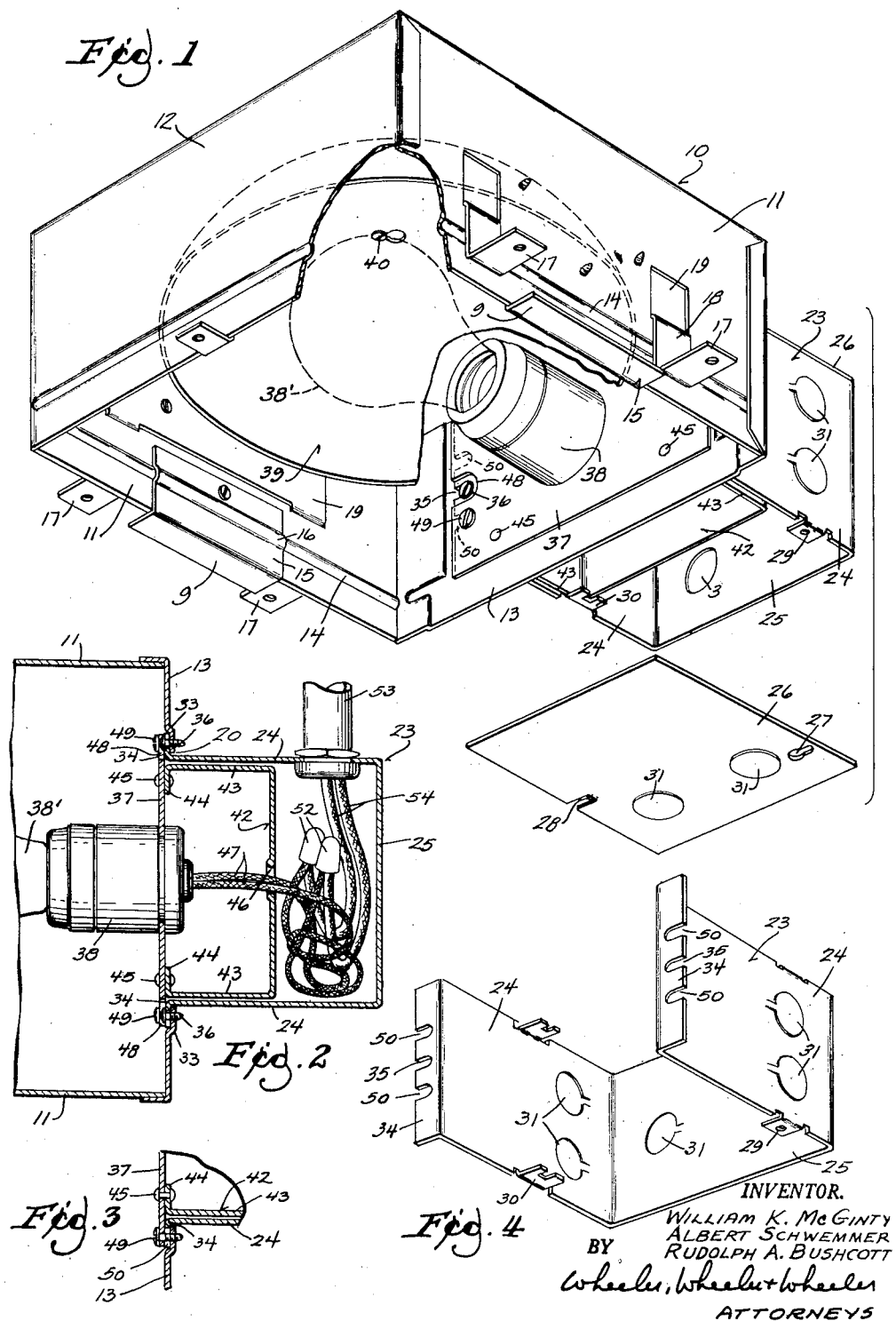
INVENTOR.
WILLIAM K. McGINTY
ALBERT SCHWEMMER
RUDOLPH A. BUSHCOTT
BY Wheeler, Wheeler + Wheeler
ATTORNEYS

United States Patent Office 2,767,307
Patented Oct. 16, 1956

2,767,307

RECESSED LIGHTING FIXTURE BOX

William K. McGinty and Albert Schwemmer, Fort Atkinson, and Rudolph A. Bushcott, Milton, Wis., assignors to Thomas Industries Inc., Fort Atkinson, Wis., a corporation of Delaware Application October 7, 1954, Serial No. 460,899

17 Claims. (Cl. 240—78)

This invention relates to improvements in a recessed lighting fixture box having an outlet or junction box unitarily mounted thereon.

Cross reference is made to our copending application Serial No. 362,500, filed June 18, 1953, now Patent No. 2,717,955.

In the device of the present invention the junction box is mounted on a wall of the recessed box. The junction box is accessible from inside the recessed box through an opening in the wall which is normally closed by a removable panel which also mounts a lamp socket and a heat baffle. The junction box is directly mounted on the recessed box wall to fully enclose the space beyond the opening.

When the panel is closed over the wall opening the portion of the junction box housing the wiring connections is thermally insulated from the recessed box. Removal of the panel, however, removes with it the heat baffle and exposes the interior of the junction box. When the panel is closed the portion of the junction box between the panel and the portion housing the wiring connections serves as a wiring conduit to the socket.

The device of the present invention is an improvement over other boxes known to us in that either rigid or flexible conduit may be connected to the junction box. Manipulation of the panel does not change the position of the junction box. A separate conduit from the junction box to the recessed box is not needed as the junction box itself serves as a wiring conduit.

In the specific embodiment shown in the drawing, a heat baffle is mounted on the panel and slides partly within the junction box to constitute the part of the junction box between the panel and baffle a dead air space for thermally insulating the part of the junction box beyond the baffle from the recessed box. In this manner we are able to maintain the portion of the junction box containing the wiring connections at a safe low temperature below the temperature in the recessed box.

Other objects and advantages of the invention will be more apparent to one skilled in the art upon examination of the following disclosure:

In the drawing:

Fig. 1 is a bottom perspective view of a device embodying our invention.

Fig. 2 is a fragmentary cross sectional view taken through the junction box and portions of the recessed box to which it is connected.

Fig. 3 is an enlarged cross sectional view showing the connections of the junction box, panel and baffle, and recessed box.

Fig. 4 is a bottom perspective view of the junction box body wrap, disassociated from the recessed box.

The recessed lighting fixture box 10 is provided with side walls 11 and end walls 12 and 13. The side walls 11 may be provided with marginal reinforcing ribs 14 and removable plates 15 channeled at 16 to fit over the ribs 14. The plates 15 are provided with outwardly turned flanges 9 which cooperate with feet 17 which extend outwardly from legs 18 of slide plate 19. The flanges 9 and feet 17 are used to clamp the box 10 to lathe and plaster bordering a ceiling or wall aperture in which the box is recessed. This mounting structure is no part of the present invention and is described in greater detail in co-pending application Serial No. 450,951, filed August 19, 1954.

Wall 13 of box 10 is provided with a large aperture 20. The aperture provides access from the inside of recessed box 10 to junction box 23. The junction box comprises side walls 24, end wall 25 and upper and lower removable top and bottom closure plates 26. Plates 26 may be provided at opposed margins with key hole slots 27 and offset lugs 28 which serve to mount the plates on the respective lugs 29 and 30 formed from the side walls 24 of the junction box. The several walls and closure plates of the junction box may be provided with conventional knockouts 31.

Wall 13 of box 10 may be offset outwardly at 33 about opening 20 to provide an embossed seat for outturned flanges 34 formed at the inner ends of side walls 24 of the junction box. Each flange 34 is provided with a central slot 35 and side slots 50 at both sides of the central slot. The flanges are fastened to the wall seat 33 by screws 36 which engage the margins of the flanges about slot 35 to clamp the respective flanges 34 thereagainst. Except for opening 20 the junction box is completely enclosed.

Opening 20 may be closed from inside the recessed box by panel 37 which carries lamp socket 38 inside the recessed box. A lamp 38' may be screwed into socket 38 and thereby positioned beneath the reflector 39 mounted by screw 40 to the top wall of the recessed box 10.

Panel 37 carries a baffle plate 42 which substantially fills the cross section of the junction box. The plate 42 is provided with integral parallel legs 43 with inturned flanges 44 connected by means of the rivets 45 or the like to the panel 37. Accordingly, the panel provides a common mounting for both the socket and baffle plate for unitary handling.

Panel 37 is provided with a lateral notch 48. In the mounted position of the panel notch 48 aligns with screw 36. The notch is of greater lateral dimension than the screw head to permit snug fitting of the panel against the junction box side wall flanges 34. Panel 37 may be mounted against the flanges 34 by screws 49 which pass through the aligned slots 50 in flanges 34 to permit engagement of screws 49 with the side wall of recessed box 10. The provision for slots 50 at both sides of central slot 35 permits panel 37 to be inverted. Regardless of the position of panel 37 its screws 49 will align with slots 50 in flanges 34.

As best shown in Fig. 2 a rigid conduit 53 may be connected to a side wall 24 of the junction box. Wiring 54 in conduit 53 may be connected to the wiring 47 from socket 38. Baffle plate 42 is provided with an opening 46 through which the wiring 47 may extend from the socket into the portion of the junction box beyond the baffle 42. The connections 52 are thus disposed in the portion of the box between baffle 42 and the junction box end wall 25. The space between panel 37 and baffle 42 comprises a dead air space for thermal insulation of the junction box portion beyond baffle 42 from the box 10. The heat from the lamp, of course, raises the temperature within the recessed box 10 to a level considered unsafe for the connections in the junction box. The dead air space aforesaid, however, provides adequate thermal insulation to maintain the temperature within the portion of the junction box beyond baffle 42 at a safe level.

Since the junction box is completely enclosed, the portion of the junction box between panel 37 and baffle 42 also provides a fully enclosed conduit for wiring 47.

Sufficient slack is left in the wiring 54 so that upon removal of screws 49 the panel 37 and baffle 42 may be drawn into and beyond recessed box 10 to provide access to the connections 52 through the aperture 20. Withdrawal of the baffle through the aperture 20 and within the box 10 exposes the wiring to enable electrical connections to be made within the relatively large and open space provided by housing 10. The panel 37 may even be drawn completely out of the housing 10 so that the connections may be made exteriorly thereof. When the connections are made, baffle 42 is re-inserted into the junction box and panel 37 pushed to closed position. The baffle then acts as a push plate to move the wiring slack and connections to the rear of the junction box.

Manipulation of the baffle does not affect the physical location of the junction box or disturb its connection to the rigid conduit 53. The dead air space and the ceramic socket 38 and the base of the lamp itself all intervene between the source of heat (the lamp filament) and the junction box. Only one set of screws 49 need be manipulated to release the panel 37 and give access to the junction box.

We claim:

1. The combination with a lighting fixture box adapted to be recessed in a wall, said fixture box comprising a wall having an opening, of a junction box having a side opening mounted on said wall of said fixture box with the side opening facing said wall opening, said junction box being accessible from inside said fixture box through said opening, a heat baffle, means removably mounting said heat baffle between said junction box and said fixture box, and a lamp socket mounted on said means for unitary handling therewith and to be disposed together with said heat baffle between a lamp mounted in said socket and the junction box to heat insulate said junction box from said lamp.

2. The device of claim 1 in which said mounting means comprises a closure for said opening and means fastening said closure to said wall over said opening.

3. The device of claim 1 in which said mounting means comprises a closure for said opening and means fastening said closure to said wall over said opening, said heat baffle comprising a plate and means on which the plate is mounted within the junction box, said plate being spaced from said closure.

4. The device of claim 1 in which said junction box has a top, bottom and side walls, said baffle comprising a plate substantially filling the cross section of said junction box between said top, bottom and side walls, a panel closure for said wall opening and means for removably mounting said panel to close said opening, and means connecting said panel and baffle plate in spaced relation for unitary handling and to define an air space therebetween.

5. The device of claim 4 in which the side walls of the junction box have out-turned flanges within said recessed box and means for mounting said flanges to the margins of the recessed box wall about said wall aperture.

6. The device of claim 4 in which said connecting means comprise plate legs disposed along the side walls of the junction box.

7. The device of claim 6 in which said legs have in-turned flanges mounted on said panel.

8. In a device of the character described, the combination with a recessed lighting fixture box having an apertured side wall, a junction box comprising walls mounted on said side wall, a panel closure for said aperture and means for mounting said closure over said aperture, and a baffle mounted on said panel and projecting into said junction box, said panel being provided with a lamp socket for unitary handling with the baffle and said baffle being provided with an aperture, and wiring from said socket through said baffle aperture into the portion of said junction box beyond said baffle, the portion of said junction box between said panel and baffle comprising a conduit for said wiring.

9. In a device of the character described, a recessed lighting fixture box having an apertured wall, a junction box mounted on said wall and having walls enclosing a space beyond said aperture, a closure plate for said aperture, a lamp socket mounted on the closure plate, a baffle mounted on said closure plate for unitary handling with the lamp socket, said baffle being laterally offset from the plate to project into said junction box to thermally insulate the portion of said junction box beyond said baffle from said recessed box, and means for releasably mounting said closure plate, lamp socket and baffle on said recessed box wall with the baffle at one side of the wall in said junction box, the lamp socket at the other side of the wall in the recessed lighting fixture box and the closure plate closing said wall aperture.

10. The device of claim 9 in which the junction box walls include a wall having a flange mounted on the inside of the recessed box wall, said flange having an opening through which the means for mounting the closure plate extends.

11. The device of claim 10 in which said flange is provided with an additional opening whereby one of said openings aligns with said means regardless of the position of the closure plate.

12. The combination with a lighting fixture box adapted to be recessed in a wall and having a first opening disposed to expose the interior of the fixture box through said wall, said fixture box also being provided with an interior wall having an opening, of a junction box outside the said interior wall of said fixture box and having a cross section less than said second opening for passage thereof through said second opening, support means for said junction box extending through said second opening, and means accessible from inside said fixture box for fastening said support means to the said interior wall of the fixture box, whereby the junction box may be dismounted from said fixture box by an operator having access thereto solely through the first mentioned opening of said fixture box.

13. The device of claim 12 in which said support means comprises a wall of said junction box extending through said second opening and having a flange lapping as interior margin of the said fixture box wall about said second opening.

14. The device of claim 13 in further combination with a closure for said fixture box second opening, said closure having margins lapping the junction box wall flange, and means independent of the means fastening the junction box to said fixture box interior wall for fastening the closure to said fixture box interior wall.

15. The device of claim 14 in which said junction box wall flange is apertured in registry with the fastening means for said closure whereby to pass said closure fastening means for engagement with said fixture box interior wall.

16. The device of claim 14 in which said closure is provided with a lamp socket and heat insulating means fixed to said closure for unitary handling with said closure.

17. The combination with a recessed lighting fixture box having a wall with an opening, means mounted on said fixture box and providing a chamber to accommodate therein the wiring connections, a first wall forming a closure for said opening, a second wall spaced from said first wall and forming a wall of said chamber, means connecting said first and second walls in spaced relation for unitary movement with respect to said fixture box and said chamber, a lamp socket mounted on said first wall for said opening for unitary handling with said first and second walls, said spaced first and second walls defining a thermal barrier between said chamber and said fixture box.

References Cited in the file of this patent

UNITED STATES PATENTS

| | | |
|---|---|---|
| 1,748,352 | Knapp | Feb. 25, 1930 |
| 1,856,590 | Pfeiffer | May 3, 1932 |
| 2,561,986 | Jones | July 24, 1951 |
| 2,588,760 | Pryne | Mar. 11, 1952 |
| 2,630,521 | Kirlin | Mar. 3, 1953 |
| 2,717,955 | Schwemmer et al. | Sept. 13, 1955 |